Nov. 29, 1960
L. H. MORIN
2,961,717
METHOD FOR SECURING LABELS TO SPOOL ENDS
Filed Aug. 23, 1956
2 Sheets-Sheet 2
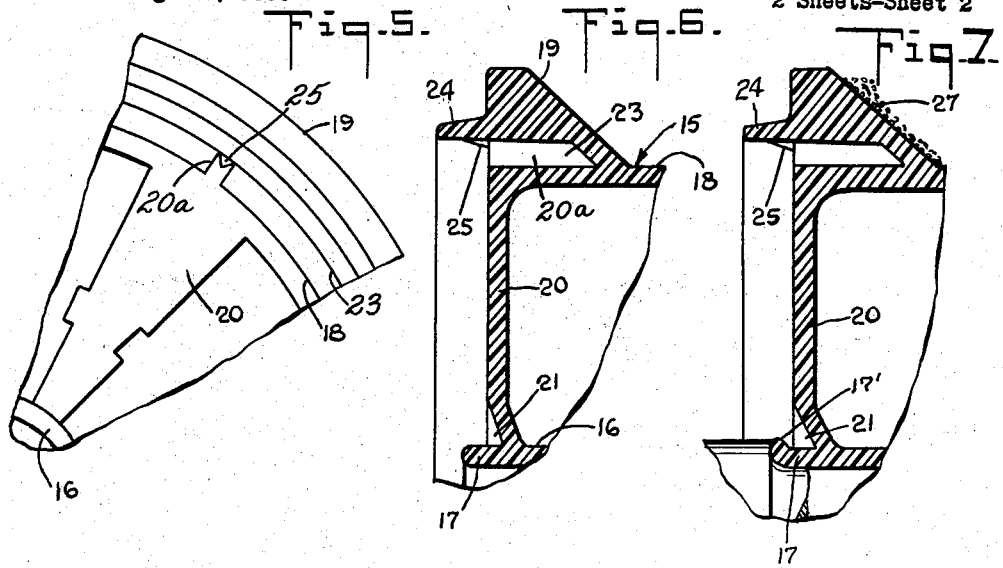
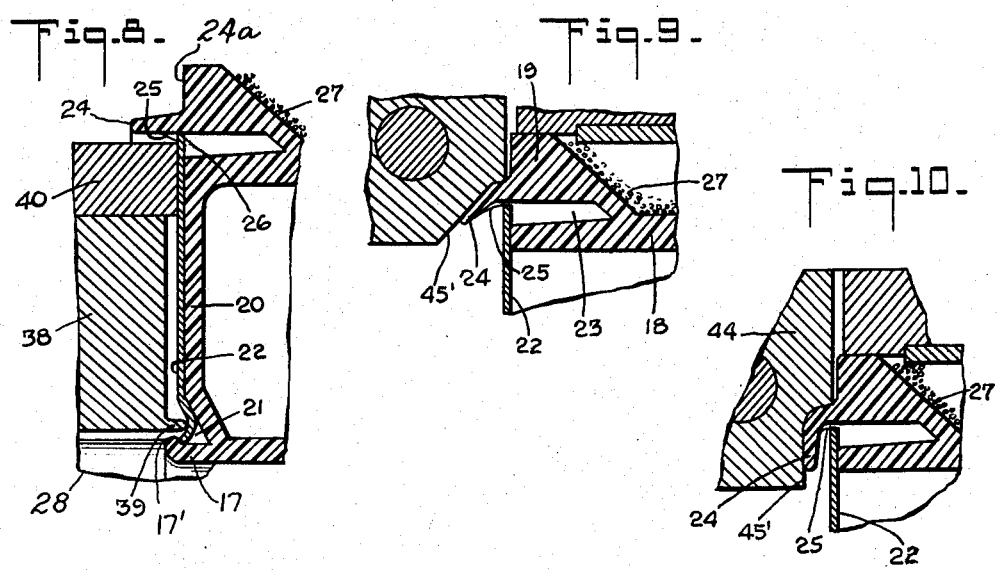
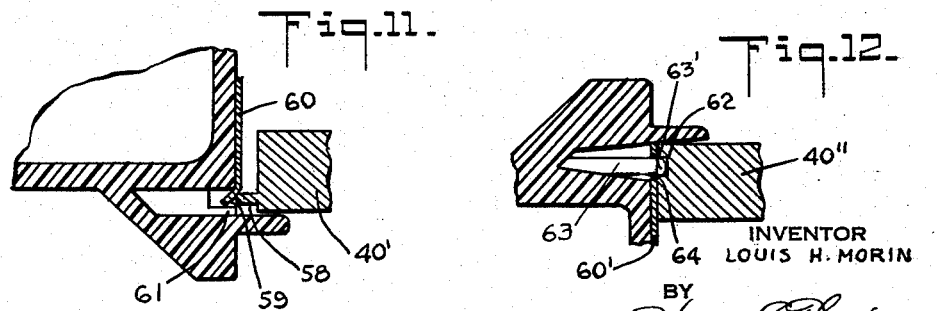
INVENTOR
LOUIS H. MORIN
BY
ATTORNEY

United States Patent Office 2,961,717  
Patented Nov. 29, 1960

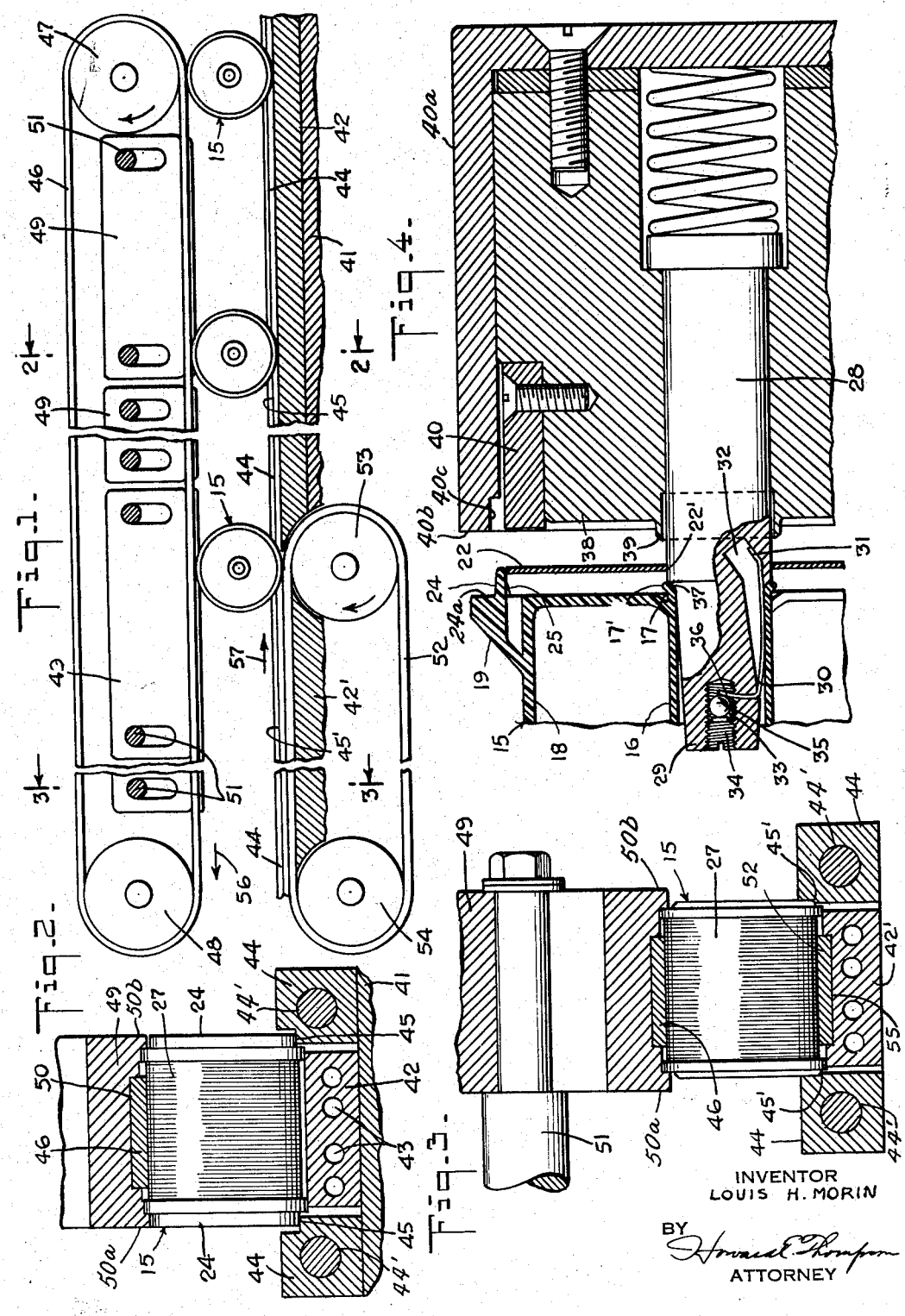

2,961,717
METHOD FOR SECURING LABELS TO SPOOL ENDS

Louis H. Morin, Bronx, N.Y., assignor to Coats & Clark, Inc., New York, N.Y., a corporation of Delaware Filed Aug. 23, 1956, Ser. No. 605,837

7 Claims. (Cl. 18—59)

This invention relates to plastic thread spools and the application of labels to end portions thereof. More particularly, the invention deals with the method for shaping spool ends to temporarily support labels in position thereon and, then, in shaping product label retainer flanges in position to engage and positively support labels on the ends of the spool in a continuous process, whereby relatively high speed production of labeled spools is accomplished.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic broken side and sectional view of an apparatus for heating and shaping flanged ends of spools in the operation of retaining labels thereon.

Fig. 2 is a diagrammatic sectional view, substantially on the line 2—2 of Fig. 1, omitting part of the construction.

Fig. 3 is a view similar to Fig. 2 taken substantially on the line 3—3 of Fig. 1.

Fig. 4 is a diagrammatic sectional view through a spool shaping and label attaching mechanism.

Fig. 5 is a small sectional end view of a spool, illustrating one of a number of circumferentially space label engaging prongs which are employed at ends of the spool.

Fig. 6 is a sectional detail view through a part of one end portion of a spool, preparatory to shaping a part thereof.

Fig. 7 is a view similar to Fig. 6, diagrammatically illustrating the shaping of the spool by part of the mechanism, as illustrated in Fig. 4.

Fig. 8 is a view, generally similar to Figs. 6 and 7, diagrammatically illustrating part of the mechanism of Fig. 4 in applying the label to the spool end.

Figs. 9 and 10 are diagrammatic sectional views showing an intermediate and finished stage of shaping the label retaining flange of the spool by the mechanism, as diagrammatically shown in Figs. 1 to 3, inclusive.

Fig. 11 is a diagrammatic sectional view, illustrating a modified method of temporarily retaining the periphery of a label in position on the spool end; and Fig. 12 is a view, similar to Fig. 11, showing another method of temporarily securing a label in position on the spool end.

This application is a continuation-in-part of my prior applications, identified as follows:

Serial Number 442,137, filed July 8, 1954, now abandoned.
Serial Number 442,138, filed July 8, 1954, now Patent No. 2,922,192.
Serial Number 442,140, filed July 8, 1954.
Serial Number 512,749, filed June 2, 1955.

In the production of thread spools of the type and kind under consideration, there has been a problem of attachment of labels to the spool ends. To simplify this problem, I have conceived a method and apparatus whereby spools of the kind under consideration can be labeled in a continuous processing at relatively high speed, thereby materially stepping up production and minimizing cost of this operation.

Considering Figs. 4 to 10, inclusive, in these figures, I have shown, in part, a plastic spool 15, comprising a central tubular portion 16 having protruding ends or flanges, one of which is indicated at 17. At 18 is indicated the barrel portion, including the rim ends, one of which is shown at 19, the latter joining the tubular portion 16 in circumferentially spaced ribs or wall portions, one of which is indicated at 20. It will be noted that the wall portions or ribs 20 are set inwardly adjacent the tubular portion 16, as noted at 21, to provide clearance for tools and flexure of a label 22, as indicated in Fig. 8 of the drawing. This operation will be described in detail later.

The rim portion 19 of the spool ends, beyond the barrel portion 18 has an annular recess 23 and radially outwardly of the recess, the rim 19 has an outwardly projecting flange portion 24, the inner surface of which, adjacent the outer end of the recess 23, includes an inwardly projecting V-shaped label engaging prong or rib 25, these prongs being spaced at circumferential intervals at the spool end. More particularly, each prong 25 extends longitudinally outwardly of a rib, such as the rib 20a, these ribs 20a being spaced circumferentially of the end wall of the spool as disclosed in copending application Serial No. 486,664, filed February 7, 1955. The prongs are adapted to engage the peripheral edges of the label 22, as indicated at 26 in Fig. 8 of the drawing in aiding temporary support of the label on the end of the spool. As noted in Figs. 7 and 8 of the drawing, as well as in other figures, the winding of thread is diagrammatically illustrated on the barrel and rim portion of the spool at 27.

The first step in the attachment of the labels to the spools described is diagrammatically illustrated in Fig. 4 of the drawing, in which figure part of a spool shaping and label applying mechanism is disclosed. In this figure, 28 represents a spring backed forming tool, having a tapered end 29, in which is supported a spring finger 30 having a rounded free end 31 adapted to be moved into a recess 32 in the tool 28 and end portion 29 thereof. The other end of the spring rod 30 extends into a threaded bore 33, having a plug 34 operating upon a ball 35 to adjustably engage the inwardly extending end 36 of the spring finger in controlling the extension of the finger so as to provide light tensional engagement with the inner central aperture 22' of the label 22 in support of the label on the tool, preparatory to movement of the label onto the end of the spool, as later described. While only one spring finger 30 is shown, a number of these fingers can be spaced circumferentially of the end portion 29 to increase the gripping engagement with the label. The end portion 29 joins the body portion of the tool 28 in a rounded forming part or collar 37, which is adapted to engage the protruding end 17 of the tube 16 to slightly enlarge or bead said end, as indicated at 17' in Figs. 4, 7 and 8 of the drawing, in performing the shaping operation previously described.

It will be seen from a consideration of Fig. 8 of the drawing that, in moving the label 22 over the tool by a plunger sleeve 38, the label 22, adjacent the central aperture 22', will be sprung over the bead 17' by an extending flange 39 on the plunger 38 which momentarily flexes the label into the recess 21, as noted in Fig. 8 of the drawing.

Associated with the plunger 38 and enveloping the same is a rubber or metallic ring 40 which extends beyond the end surface of the sleeve 38 and is adapted to engage the peripheral portion of the label 22 in forcing said peripheral portion onto the V-shaped prongs 25 to positively and fixedly engage the labeled periphery at circumferentially spaced intervals, thus retaining the label in substantially flat engagement with the end wall ribs 20 of the spool, preparatory to hopper or otherwise feeding the spools with the labels so attached to the mechanism of Figs. 1 to 3, inclusive, for permanent attachment of the labels to the spool ends. During movement of plunger 38 and ring 40, it may be noted (Fig. 4) that shoulder 40b of casing 40a will butt against the rim end surface 24a of the spool which is disposed radially outwardly of the rim flange 24, the shoulder being cut out at 40c to receive the flange 24. Such butting action of shoulder 40b serves to limit movement of ring 40 and flange 39 to the amount necessary to position the label in contact with the end face of the spool.

It will be apparent that suitable means, not shown, is provided for movement of a pair of tools, including the plunger sleeves and rings, simultaneously upon opposed ends of a spool in the application of labels thereto, as above described. It will be understood, in this connection, that, at the station employing the tool 28, plunger 38 and the ring 40, means will be provided for delivery of labels onto the ends of the tool 28 inwardly of, but adjacent, the forming collar 37. In this operation, the labels are forced over the spring finger or fingers 30, illustrated in Fig. 4 of the drawing. It will also be understood, at this time, that, in delivery of the spools 15 to the shaping station, including the tool 28, the end portion 17 of the spool will be heated sufficiently to perform the beading, as at 17'.

In Fig. 1 of the drawing, I have diagrammatically shown the mechanism for forming or bending the annular flanges 24 in securing the labels 22 in position upon the spool ends, end and sectional portions only of the apparatus being illustrated to simplify the showing. In said figure, 41 diagrammatically illustrates a workbench or platform, upon which is arranged a base track 42 having, at the forming end portion of the apparatus, a portion 42'. This track has a series of water circulating apertures 43 for cooling the track to prevent heat flow onto the spool proper beyond the flanges 24, and to prevent overheating the flanges. The latter roll over and are heated by elongated heated rails or elements 44, which in turn are suitably heated as by cartridge heaters 44' disposed at and spaced from sides of the track and recessed, as seen at 45, to receive the flanges 24 of the spool, as clearly indicated in Fig. 2 of the drawing. The elements 44, at the left end portion of the apparatus, as noted in Fig. 1 of the drawing, have the recesses 45 shaped to form forming tools, as noted at 45' in Fig. 3 of the drawing, these tools being also clearly illustrated in Figs. 9 and 10 of the drawing. Fig. 9 shows the tool 45' in an intermediate stage where the flange 24 is partially shaped inwardly; whereas, in Fig. 10 of the drawing, the tool 45' shows the completion of this operation with the flange 24 extending over and definitely retaining the label against displacement. Slight clearances are provided to prevent the heated flange from coming directly in engagement with the label. It will be apparent, however, that the prongs 25 are also flexed over the periphery of the label in more fixedly retaining the label upon the end of the spool.

From the foregoing, it will be apparent that the rails or elements 44, in addition to being heating elements, are forming or shaping elements and, in the early stages of the apparatus, that is, from drive pulley 47 to drive pulley 53, the recesses 45 have the shape indicated in Fig. 2, serving simply as guiding recesses and establishing contact with the flanges to pre-heat the same. Between pulleys 53 and 54 the shape of these recesses is gradually changed so that they form the tools 45' which gradually change the contour of the flanges 24, as seen in Fig. 2, to the completed formation of the flanges 24, as seen in Fig. 10 of the drawing.

To guide and rotate the spools along the base track 42, I provide an elongated feed belt 46 actuated through a drive pulley 47 and a widely spaced adjustable idler pulley 48, the belt 46 engaging the thread portion 27 of the spool, note Fig. 2, in the feed of the spools from right to left, as noted in Fig. 1 of the drawing. The threaded portion 27 is out of contact with the track 42 or 42', as shown by the spacing in Figs. 2 and 3, the spools rolling over the tracks and making contact therewith only on the surfaces of their rim portions 19 (note Fig. 9).

Weighted upper guide rails 49 are spaced along the track 42 to apply pressure on the belt and upon the spools. These rails are grooved, as noted at 50 in Fig. 2 of the drawing, in positioning and centralizing the belt 46 in its movement. At each side of groove 50, and somewhat spaced therefrom, are depending lips or projections 50a and 50b which engage peripheral portions of the end face of the spool, that is, radially outwardly of the flanges 24. These lips control the rolling spool against endwise movement, keeping the spool rolling in a straight linear path along track 42. The weighted rails 49 are suitably supported by spaced rods, one of which is clearly illustrated at 51 in Fig. 3. Rails 49 hang loosely on rods 51 so that the weight of the rails rests on the belt, thus establishing contact with the spools through the belt.

At a predetermined distance from the drive pulley 47, the table or platform 41 is recessed to receive an auxiliary drive belt 52 passing around a drive pulley 53 and an adjustable idler pulley 54. The belt 52 operates in a recess 55 in the end portion 42' of the base rail 42, as clearly noted in Fig. 3 of the drawing, thus supporting the belt 52 in firm engagement with the spools at a point below the end portion of the feed belt 46. The lower run of the feed belt 46 in engagement with the spools is moving in the direction of the arrow 56 of Fig. 1; whereas, the upper run of the belt 52 in engagement with the spools is moving in the direction of the arrow 57. The purpose of this construction is to rotate the spools at a high speed greater than their speed of rotation while on the belt 46, so as to rotatably move the flanges 24 over the forming or shaping portions 45' of the recesses 45 in accomplishing the complete formation of the flanges from the partial showing of Fig. 9 to the final showing of Fig. 10, which latter takes place at the extreme left end of the machine, as noted in Fig. 1, after which, the finished spools are delivered onto a suitable conveyor at a delivery station to the left of the pulleys 48 and 54, this station being omitted in the showing, as it forms no particular part of the present conception. However, it will be apparent, at this time, that the spools, as delivered from the apparatus, diagrammatically shown in Fig. 1, are ready for packaging in suitable containers.

It will be understood, at this time, that, while I have illustrated the method of Fig. 1 of the drawing as applied to the shaping of flanged ends of spools, this method is applicable to the shaping of any type and kind of cylindrical plastics in forming or shaping one or both end portions thereof.

It will be apparent from the foregoing that the spools at the flange forming station on the left side of Fig. 1 are rotated a multiplicity of times in the step of feeding the spools to the discharge end of the apparatus by the belt 46 and, in practice, a number of such spools will gather at said station during this operation. Thus the feed of the spools to the station by the belt 46 operates to urge the spools to the left in the direction of the arrow 56, as will be apparent. Not only is the rotary speed of the spools increased as they are engaged by belt 52, but also their forward speed is decreased, thus creating a sufficient time interval during which the flanges 24 of the spools may be bent or curled over towards the labels. Such increase in rotary speed and decrease in forward speed is brought about by the combination of the oppositely moving belts. It will be apparent that in order to move the spools from right to left, as seen in Fig. 1, the speed of upper belt 46 is greater than that of lower belt 52.

In Fig. 11 of the drawing, I have shown a slight modification, wherein the ring 40' is modified to the extent of having an annular projecting rim 58 to force the peripheral edge 59 of a ticket 60 inwardly overm ribs, one of which is shown at 61, these being otherwise generally similar to the ribs or prongs 25. In this manner, the peripheral edges of the label are more definitely retained in position. No further description of the spool of Fig. 11 is given, as it is otherwise identical with the structure of the earlier figures.

In Fig. 12 of the drawing, I have shown a still further modification, wherein 40" represents a ring, similar to the ring 40, having an annular recess 62 in its outer surface to engage and head over one of a number of projecting ribs or pins 63 constituting part of the spool and adapted to pierce the peripheral portion of a label 60', as indicated at 64. The pins 63 are normally pointed to pierce the label and are then headed over, as seen at 63', by the recessed forming portion 62 of the ring 40".

Having fully described my invention, what I claim as new and desire to secure by Letters Patent is:

1. Method of attaching end ticket labels to plastic thread spools wherein each spool comprises an inner tube, an outer barrel, and a pair of end walls joining the tube and barrel, said tube having a flange extending longitudinally outwardly from the end face of each end wall, each end portion of the spool having an enlarged bevelled rim extending radially outwardly therefrom and terminating in a peripheral portion on the barrel side of the spool, said rim having a circumferentially extending end surface that is flush with said end face of the spool, a flange extending longitudinally outwardly from said rim end surface and disposed radially inwardly of said rim peripheral portion, and wherein each end wall radially inwardly of said rim flange has circumferentially spaced prong means for engaging outer peripheral portions of a label to temporarily hold said label, said method comprising: heating each said tube flange and bending the heated flange in a radially outward direction, moving towards each spool end face a centrally apertured label the aperture of which is smaller in diameter than the diameter of said bent tube flange, moving said label into contact with said end face by springing the aperture-defining portions of the label over said bent tube flange and coincidently therewith engaging outer peripheral portions of the label with said circumferentially spaced prong means, thereby to temporarily hold the label in place in a flat position on said end face; then mounting thread on each spool; passing the threaded spools to a preheating zone of a rim flange shaping station by introducing the same to a track over which the spools are adapted to roll, engaging the threaded upper sides of the spools by means of a moving belt to roll the spools along said track, said peripheral portions of the rims of each spool engaging the track while the thread is maintained out of contact with the track, loosely supporting a series of longitudinally spaced weighted guide rails on the belt to apply downward pressure thereto in order to firmly engage the spools between the belt and the track, controlling endwise movement of the rolling spools by engaging each spool at said rim end surfaces on each end face by means of a pair of oppositely disposed lips which depend from said guide rails, each spool while being rolled along said preheating zone being in heat exchange relationship to a pair of oppositely disposed heated shaping rails each having a recessed portion disposed adjacent an end face of the spool, said rim flanges of each spool being preheated by said heated shaping rails; rolling the spools having preheated rim flanges out of said preheating zone and into a shaping zone of said rim flange shaping station by engaging the threaded lower side of each spool by a second belt which moves along and is guided by said track, moving the run of the second belt engaging the spool at a lower speed than and in a direction opposite to the run of the first belt engaging the spool in order to increase the rotary movement of the spool and to decrease the forward movement thereof while maintaining forward movement, engaging the preheated rim flanges of each spool endwise thereof by said heated recessed portions of said shaping rails in said shaping zone to exert pressure on said rim flanges in a radially inward direction, said recessed portions thus serving as shaping tools, progressively bending the heated rim flanges toward said labels by means of said shaping tools while moving each spool forward until said rim flanges permanently retain the labels in place on the end faces of the spool, then removing from said shaping station each spool having the rim flanges thereof bent in label-retaining position and cooling said track during the heating of said rim flanges to prevent overheating of the spool.

2. Method of attaching end ticket labels to plastic thread spools wherein each spool comprises an inner tube, an outer barrel, and a pair of end walls joining the tube and barrel, said tube having a radially outwardly bent flange projecting from the end face of each end wall, each end portion of the spool having an enlarged bevelled rim extending radially outwardly therefrom and terminating in a peripheral portion, said rim having a circumferentially extending end surface that is flush with said end face of the spool, a flange extending longitudinally outwardly from said rim end surface and disposed radially inwardly of said rim peripheral portion, and wherein each end wall radially inwardly of said rim flange has circumferentially spaced prong means for engaging outer peripheral portions of a label to temporarily hold said label, said method comprising: moving towards each spool end face a centrally apertured label the aperture of which is smaller in diameter than the diameter of said bent tube flange, moving said label into contact with said end face by springing the aperture-defining portions of the label over said bent tube flange and coincidently therewith engaging outer peripheral portions of the label with said circumferentially spaced prong means, thereby to temporarily hold the label in place in a flat position on said end face; passing the spools to a preheating zone of a rim flange shaping station by introducing the same to a track over which the spools are adapted to roll, engaging the upper sides of the spools to roll the spools along said track, rolling each spool in heat exchange relationship to a pair of oppositely disposed heated shaping rails, said rim flanges being thereby preheated, rolling the spools having preheated rim flanges out of said preheating zone and into a shaping zone of said rim flange shaping station, movably engaging the lower side of each spool to increase the rotary movement of the spool and to decrease the forward movement thereof while yet maintaining forward movement, engaging the preheated rim flange of each spool endwise thereof by means of the heated shaping rails to exert pressure on said rim flanges in a radially inward direction, progressively bending the heated rim flanges toward said labels by means of said shaping rails while moving each spool forward until said rim flanges permanently retain the labels in place on the end faces of the spool, and then removing from said shaping station each spool having the rim flanges thereof bent in label-retaining position.

3. Method of attaching end ticket labels to plastic thread spools wherein each spool comprises a barrel and a pair of end walls, each end portion of the spool having an enlarged bevelled rim extending radially outwardly therefrom and terminating in a peripheral portion on the barrel side of the spool, said rim having a circumferentially extending end surface that is flush with the end face of the spool, a flange disposed radially inwardly of said rim peripheral portion and extending longitudinally outwardly from said rim end surface, and wherein each end wall radially inwardly of said rim flange has circumferentially spaced means for engaging outer peripheral portions of a label to temporarily hold said label, said method comprising: moving a label into contact with each spool end face and within said rim flange, coincidently therewith engaging outer peripheral portions of the label with said circumferentially spaced means to temporarily hold the label in place, passing the spools to a preheating zone of a rim flange shaping station by introducing the same to a track over which the spools are adapted to roll, engaging the upper sides of the spools to roll the spools along said track, rolling each spool in heat exchange relationship to a pair of oppositely disposed heated shaping rails to preheat said rim flanges, rolling the spools having preheated rim flanges out of said preheating zone and into a shaping zone of said rim flange shaping station, movably engaging the lower side of each spool to increase the rotary movement of the spool and to decrease the forward movement thereof while yet maintaining forward movement, engaging the preheated rim flange of each spool endwise thereof by means of the heated shaping rails to exert pressure on said flanges in a radially inward direction, progressively bending the heated rim flanges toward said labels by means of said shaping rails while moving each spool forward until said rim flanges permanently retain the labels in place on the end faces of the spool, and then removing from said shaping station each spool having the rim flanges thereof bent in label-retaining position.

4. Method of attaching end ticket labels to plastic thread spools wherein each spool comprises a barrel and a pair of end walls, each end portion of the spool having an enlarged bevelled rim extending radially outwardly therefrom and terminating in a peripheral portion on the barrel side of the spool, said rim having a circumferentially extending end surface that is flush with the end face of the spool, and wherein a flange is disposed radially inwardly of said rim peripheral portion and extends longitudinally outwardly from said rim end surface, said method comprising moving a label into contact with each spool end face and within said rim flange, passing the spools to a preheating zone of a rim flange shaping station by introducing the same to a track over which the spools are adapted to roll, engaging the upper sides of the spools by means of a moving belt to roll the spools along said track, rolling each spool in heat exchange relationship to a pair of oppositely disposed heated shaping rails to preheat said rim flanges, rolling the spools having preheated rim flanges out of said preheating zone and into a shaping zone of said rim flange shaping station, engaging the lower side of each spool by a second belt, moving the run of the second belt in engagement with the spool in a direction opposite that of the run of the first belt in engagement with the spool and at a lower speed than the said run of the first belt in order to increase the rotary movement of the spool and to decrease the forward movement thereof while maintaining forward movement, engaging the preheated rim flange of each spool endwise thereof by means of the heated shaping rails to exert pressure on said rim flanges in a radially inward direction, progressively bending the heated rim flanges toward said labels by means of said shaping rails while moving each spool forward until said rim flanges permanently retain the labels in place on the end faces of the spool, then removing from said shaping station each spool having the rim flanges thereof bent in label-retaining position.

5. Method of attaching end ticket labels to plastic thread spools wherein each spool comprises a barrel and a pair of end walls, each end portion of the spool having an enlarged bevelled rim extending radially outwardly therefrom and terminating in a peripheral portion on the barrel side of the spool, said rim having a circumferentially extending end surface that is flush with the end face of the spool, and wherein a flange is disposed radially inwardly of said rim peripheral portion and extends longitudinally outwardly from said rim end surface, said method comprising: moving a label into contact with each spool end face and within said rim flange, passing the spools to a preheating zone of a rim flange shaping station by introducing the same to a track over which the spools are adapted to roll, engaging the upper sides of the spools to roll the spools along said track, rolling each spool in heat exchange relationship to a pair of oppositely disposed heated shaping rails to preheat said rim flanges, rolling the spools having preheated rim flanges out of said preheating zone and into a shaping zone of said rim flange shaping station, movably engaging the lower side of each spool to increase the rotary movement of the spool and to decrease the forward movement thereof while yet maintaining forward movement, engaging the preheated rim flange of each spool endwise thereof by means of the heated shaping rails to exert pressure on said flanges in a radially inward direction, progressively bending the heated rim flanges toward said labels by means of said shaping rails while moving each spool forward until said flanges permanently retain the labels in place on the end faces of the spool, and then removing from said shaping station each spool having the rim flanges thereof bent in label-retaining position.

6. Method of attaching end ticket labels to plastic thread spools wherein each spool comprises a barrel and a pair of end walls, each end portion of the spool having an enlarged bevelled rim extending radially outwardly therefrom and terminating in a peripheral portion on the barrel side of the spool, said rim having a circumferentially extending end surface that is flush with the end face of the spool, and wherein a flange is disposed radially inwardly of said rim peripheral portion and extends longitudinally outwardly from said rim end surface, said method comprising: moving a label into contact with each spool end face and within said rim flange, passing the spools to a preheating zone of a rim flange shaping station by introducing the same to a track over which the spools are adapted to roll, engaging the upper sides of the spools to roll the spools along said track, rolling each spool in heat exchange relationship to a pair of oppositely disposed heated shaping rails to preheat said rim flanges, rolling the spools having preheated rim flanges into a shaping zone of said rim flange shaping station, engaging the preheated rim flange of each spool endwise thereof by means of the heated shaping rails to exert pressure on said flanges in a radially inward direction, progressively bending the heated rim flanges toward said labels by means of said shaping rails while moving each spool forward until said flanges permanently retain the labels in place on the end faces of the spool, and then removing from said shaping station each spool having the rim flanges thereof bent in label-retaining position.

7. Method of attaching end ticket labels to thread spools wherein each spool has a heat bendable flange extending longitudinally outwardly of each end face thereof, said spool radially inwardly of said flange having means for engaging peripheral portions of a label to temporarily hold said label, said method comprising moving a label into contact with each end face of a spool and within the flange on said end face and coincidently therewith engaging peripheral portions of the label with said means to temporarily hold the label in place, then passing each spool to a heating zone and rolling the spools through said zone while heating said flanges thereof, engaging the heated flanges of the rolling spools endwise thereof between a pair of oppositely disposed heated shaping tools to exert pressure on said flanges and bend the same in a radially inward direction, progressively bending the heated flanges of each spool toward said labels by means of said shaping tools while rolling each spool forward until said flanges permanently retain the labels in place on the end faces of the spool, and then removing from said heating zone and shaping tools each spool having the rim flanges thereof bent in label-retaining position.

References Cited in the file of this patent

UNITED STATES PATENTS

| Number | Name | Date |
|---|---|---|
| 506,184 | McDonald | Oct. 3, 1893 |
| 719,788 | Giles | Feb. 3, 1903 |
| 877,135 | Stecher | Jan. 21, 1908 |
| 1,981,771 | Benge | Nov. 20, 1934 |
| 2,169,315 | Yngve | Aug. 15, 1939 |
| 2,259,508 | Abramson | Oct. 21, 1941 |
| 2,319,099 | Abramson et al. | May 11, 1943 |
| 2,326,889 | Schulz et al. | Aug. 17, 1943 |
| 2,356,485 | Webb | Aug. 22, 1944 |
| 2,383,896 | Taber | Aug. 28, 1945 |
| 2,393,984 | Gookin | Feb. 5, 1946 |
| 2,428,407 | Auzin | Oct. 7, 1947 |
| 2,452,357 | Collins | Oct. 26, 1948 |
| 2,479,959 | O'Neil | Aug. 23, 1949 |
| 2,509,354 | Jones et al. | May 30, 1950 |
| 2,588,604 | Archer | Mar. 11, 1952 |
| 2,648,507 | Kitzrow | Aug. 11, 1953 |
| 2,750,129 | Morin | June 12, 1956 |
| 2,769,204 | Morin | Nov. 6, 1956 |